United States Patent [19]

Zane et al.

[11] 4,155,231
[45] May 22, 1979

[54] BICYCLE LOCK AND BRACKET

[75] Inventors: Michael S. Zane; Peter L. Zane, both of Brookline, Mass.

[73] Assignee: KBL Corporation, Boston, Mass.

[21] Appl. No.: 792,184

[22] Filed: Apr. 29, 1977

[51] Int. Cl.² .......................................... E05B 71/00
[52] U.S. Cl. ...................................................... 70/18
[58] Field of Search ....................... 70/18, 260; 59/86; 114/174; 279/96

[56] References Cited

U.S. PATENT DOCUMENTS

| 263,212 | 8/1882 | Pettibone | 70/18 |
|---|---|---|---|
| 410,027 | 8/1889 | Rueckert | 70/18 |
| 1,542,016 | 6/1925 | Stull | 70/18 X |
| 2,889,451 | 6/1959 | Longo | 248/314 X |
| 3,739,607 | 6/1973 | Smedley | 70/18 |
| 3,754,418 | 8/1973 | Miller | 70/18 |
| 3,924,426 | 9/1975 | Zane et al. | 70/18 |
| 3,964,706 | 6/1976 | Adams | 248/538 X |
| 3,967,475 | 7/1976 | Zane | 70/18 |

FOREIGN PATENT DOCUMENTS 222146 5/1925 United Kingdom ..................... 70/18

Primary Examiner—Richard E. Moore

Attorney, Agent, or Firm—Morse, Altman, Oates & Bello

[57] ABSTRACT

A locking mechanism and storage bracket are provided for use in securing bicycles or the like to a post or other fixture. The lock includes a relatively large U-shaped shackle formed from cylindrical hard metal stock, one leg of which terminates in a bent foot portion. The other leg extends parallel to the first leg and is formed with a shoulder near the end thereof. The lock also includes a tubular cross piece formed with a pair of openings in register with the ends of the shackle legs and provided with a key operated lock in one end of the cross piece adapted to lock with the shoulder of the other shackle leg when assembled thereto. The bent foot portion locks to the cross piece by inserting the end of the foot in its cooperating opening and pivoting the shackle to bring the end of the other leg into its opening where it is secured by the key operated lock.

A mounting bracket is provided for storing the locking mechanism when not in use and is comprised of a tubular socket mountable to the bicycle frame and formed with a re-entrant L-shaped slot by means of which one end of the lock cross piece may be inserted in the socket with the shackle aligned with the slot opening. The lock is then pressed into the socket and rotated approximately 90° to secure it to the bracket.

5 Claims, 13 Drawing Figures

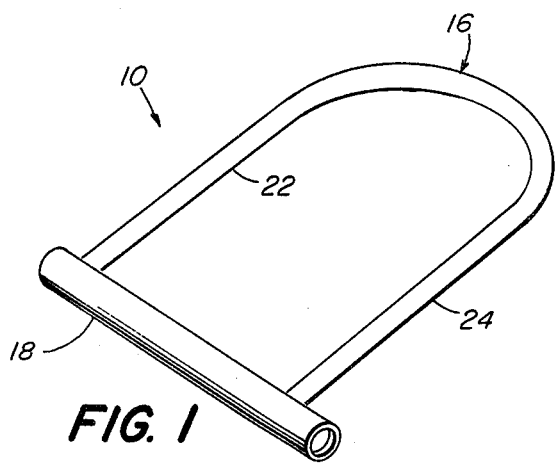
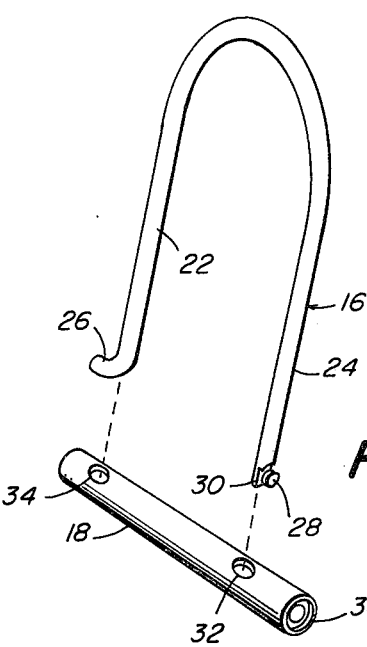
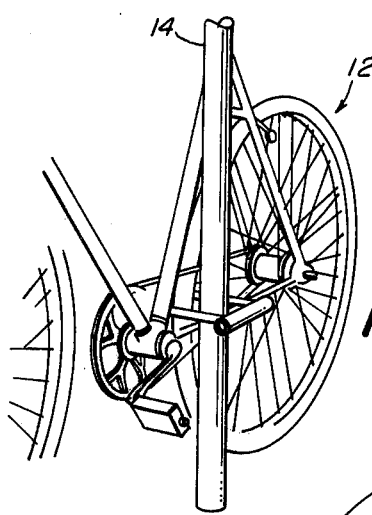
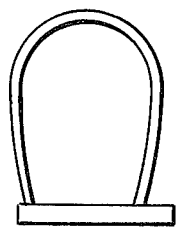
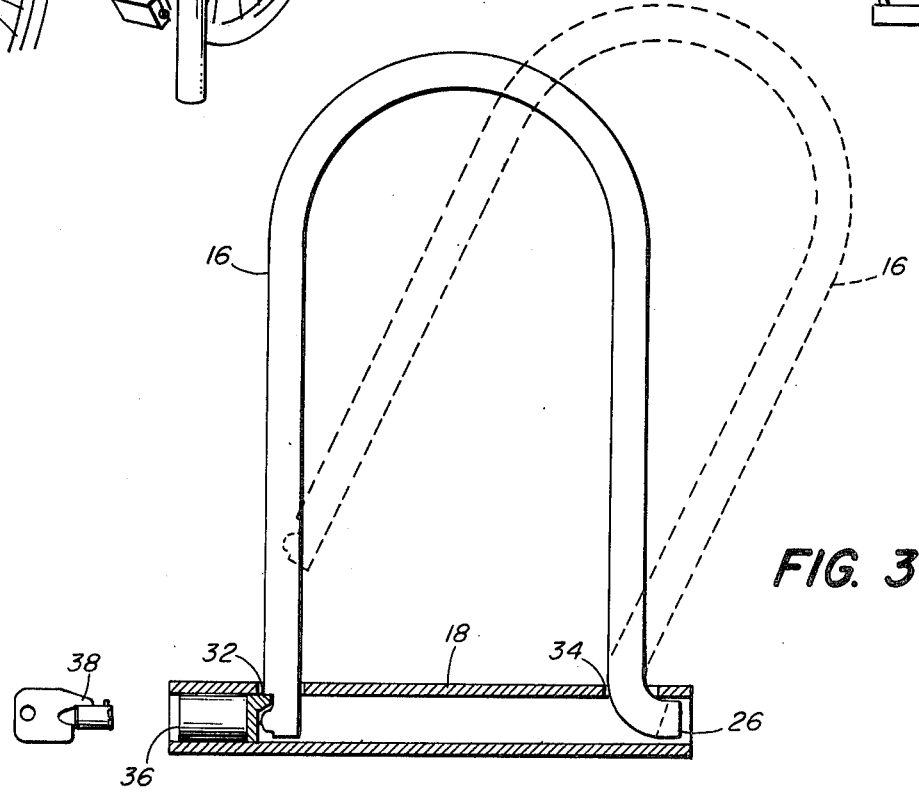

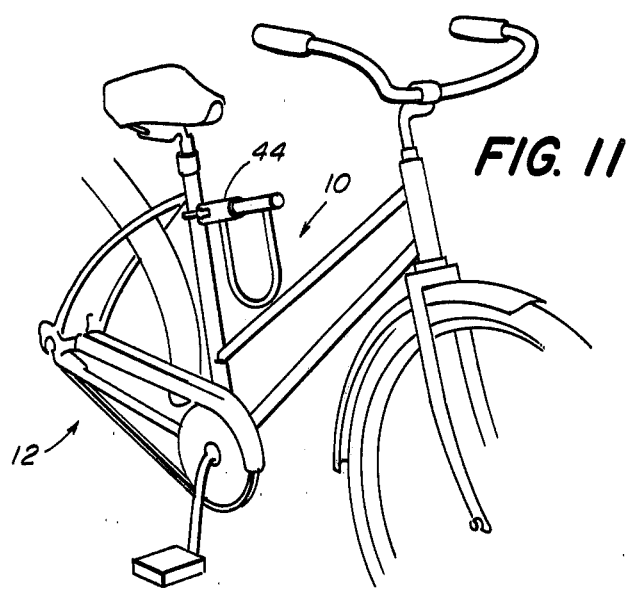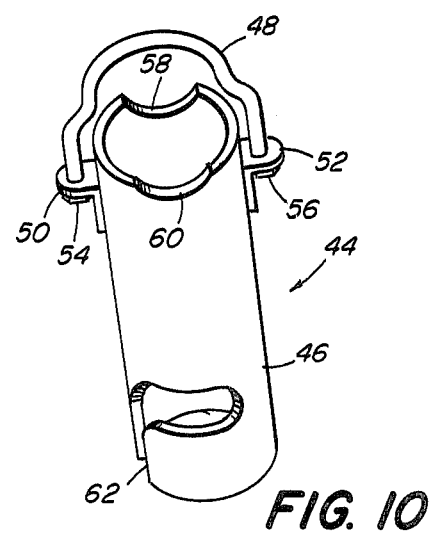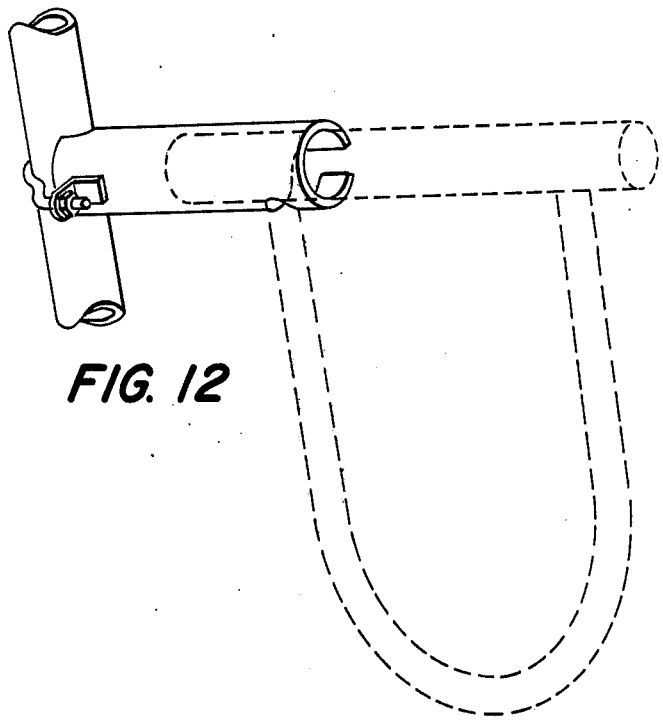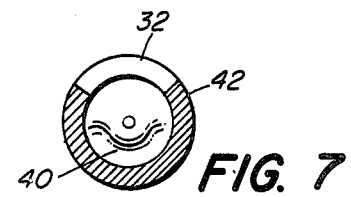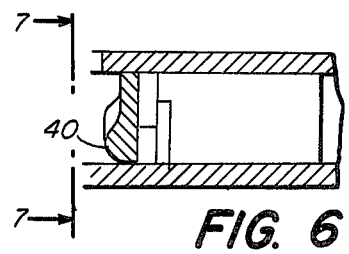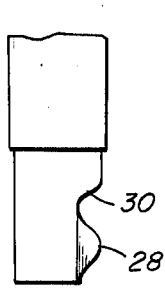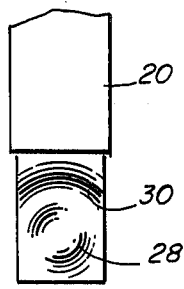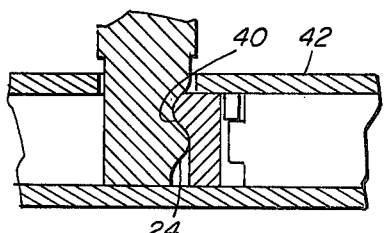

4,155,231

BICYCLE LOCK AND BRACKET

BACKGROUND OF THE INVENTION

1. Field of the Invention

This invention relates generally to locking devices and more particularly is directed towards a new and improved locking mechanism for bicycles and the like, including a bracket for storing the lock when not in use.

2. Description of the Prior Art

With the increasing number of sophisticated and expensive bicycles now in use there has been a sharp increase in bicycle thefts. The bicycles, once stolen, are difficult to trace and usually resold with a low rate of recovery. Professional bicycle thieves commonly will use a bolt cutter to sever cables, chains, or other devices used to secure the bicycle to a post, tree, or other fixed object. In order to provide a defense against such bolt cutters, large, heavy locks have been developed comprised of rigid U-shaped shackles and cross bars which attach to the ends of the shackle. Such devices offer good resistance to bolt cutters and hack saws but have tended to be somewhat awkward because of their size and are relatively expensive to fabricate.

Accordingly, it is an object of the present invention to provide a new and improved locking device for bicycles and the like, which locking device is relatively compact and simple to fabricate.

Another object of this invention is to provide a bicycle locking device of simple yet efficient construction providing positive locking action on two legs of the shackle using but a single lock.

SUMMARY OF THE INVENTION

This invention features a locking device for bicycles and the like comprising a U-shaped shackle and a cooperating cross piece adapted to lock across the ends of the shackle. The shackle is formed with a pair of parallel legs, one end terminating in an outwardly bent foot portion, the other leg being straight and terminating in a shoulder. The cross bar is of tubular construction and formed with a pair of openings adapted to receive the ends of the shackle by first inserting the bent foot portion in a pivoting action and then inserting the straight portion. A key operated lock in one end of the cross bar is adapted to engage the shoulder of the shackle to lock its leg, the other leg being held by the configuration of the foot portion.

This invention also features a storage bracket comprising a tubular socket mountable to the bicycle frame and formed with a re-entrant L-shaped slot adapted to connect with the lock by inserting one end of the cross piece with a shackle leg following the re-entrant slot.

BRIEF DESCRIPTION OF THE DRAWINGS

FIG. 1 is a view in perspective of a bicycle lock made according to the invention, FIG. 2 is an exploded view in perspective of the bicycle lock, FIG. 3 is a sectional view in front elevation of the lock demonstrating the manner in which the parts are engaged and disengaged, FIG. 4 is a view in perspective illustrating the lock in typical use, FIG. 5 is a fragmentary sectional view showing details of the locking mechanism, FIG. 6 is a view similar to FIG. 5 showing the rotatable locking cam, FIG. 7 is a cross-sectional view taken along the line 7—7 of FIG. 6, FIG. 8 is a detail front view of the locking shoulder of the shackle leg, FIG. 9 is a view in side elevation thereof, FIG. 10 is a view in perspective of a storage bracket, FIG. 11 is a view in perspective showing the bracket mounted to a bicycle with the lock attached thereto, FIG. 12 is an enlarged detail view of the bracket and lock, and, FIG. 13 is a front elevation of a modification of the invention.

DETAILED DESCRIPTION OF THE PREFERRED EMBODIMENTS

Referring now to the drawings, the reference character 10 generally indicates a locking device particularly useful in securing a bicycle 12 to a fixed object such as a post 14. The locking mechanism is comprised of two separable components, namely, a U-shaped shackle 16 and a cross piece 18 to which the shackle may be locked.

Both the shackle and the cross piece preferably are fabricated from a high grade steel which may be heat treated and should be sufficiently thick to offer effective resistance to the action of a bolt cutter or to a hacksaw. In practice, the shackle 16 is fabricated from solid cylindrical rod stock ½" in diameter, on the outer surface of which is a skin 20 of plastic, rubber, or the like, to protect the finished surfaces of the bicycle against scratching when the lock is in place. The skin 20 may be clear or colored, as desired, and may be applied by dipping or by fitting a flexible sleeve over the shackle, as preferred.

The shackle 16 is generally U-shaped and provided with a pair of parallel legs 22 and 24 of substantially the same length. In practice, the shackle 16 may have a length of perhaps 8" to 9" or so when used as a lock for a standard bicycle with the legs spaced apart by perhaps 4½" to 5". If the lock is to be used on a larger vehicle, such as a motorcycle, then the lock components may be correspondingly larger to accommodate the larger frame normally employed on a motorcycle.

The shackle leg 22 terminates in a bent end or foot 26 that is bent approximately 90° outwardly and of a relatively short length, typically ½". The leg 24, on the other hand, is straight throughout and terminates at its lower end with a cutaway portion including an outwardly facing shoulder or boss 28, the apex of which does not project beyond the surface of the leg. The cutaway portion also includes an arcuate shoulder 30 directly above the boss 28 for reasons that will presently appear.

The cross piece 18 of the preferred embodiment is of tubular construction and again fabricated from a high quality hardened steel. Preferably, the cross piece is cylindrical, having a diameter greater than the diameter of the rod stock used in making the shackle 16. In practice, an outside diameter of approximately ⅞" and an inside diameter of ⅝" has been found satisfactory. A tube length of approximately 7½" or so is employed for a lock to be used on a bicycle. The cross piece is formed with a pair of aligned openings 32 and 34 in the side of the cross piece and spaced apart from one another by a distance corresponding to the distance between the shackle legs 22 and 24. The opening 34 typically is located near one end of the cross piece and is slightly elongated while the opening 32 is circular and located inwardly from the opposite end of the cross piece by a distance of perhaps 1-½".

Mounted within the cross piece, between the opening 32 and the adjacent end of the cross piece, is a locking mechanism, preferably a rotatable lock 36. The lock 36, in the illustrated embodiment, is operated by means of a key 38 preferably of the circular type as is the key hole for the lock. Other types of locks, such as magnetically-operated locks, combination locks, and the like, may be used in lieu of the illustrated lock. In any event, the lock 36 operates an arcuate cam 40 which is rotated from an open to a locked position by means of the key. FIG. 6 shows the cam 40 in the open position, while FIG. 5 shows the cam in a locked position against the boss 28 at the lower end of the shackle leg 24. The rounded boss 28 and the cam 40, which is also rounded as well as being arcuate, are configured to mate with one another, as best shown in FIG. 5, when locked together.

The configuration of the cam and the boss provides a better distribution of shock forces in the event that an attempt is made to force the lock by striking the cross piece with a sledgehammer or similar object. The rounded configuration of the cam and the boss produces a locking engagement which is less likely to shear from such a blow than would be the case with other configurations.

The cross piece 18 may also be provided with a skin 42 about the outer exposed surfaces thereof in order to protect the bicycle finish when the lock is in use.

The U-shaped shackle 16 is connected to the cross piece 18 by first turning the lock 36 to the open or unlocked position. The bent foot 26 is then inserted in the cross piece hole 34, as suggested in dotted line in FIG. 3, by tilting the shackle 16 with respect to the cross piece. When the bent foot 26 is within the cross piece, the shackle is then tilted to bring the cutaway end of the shackle leg 24 into the cross piece opening 32, as shown in full line in FIG. 3. The lock 36 is then turned to the locking position so that the cam 40 locks between the boss 24 and the shoulder 30. The locking mechanism is now locked and the key 38 is removed. When the locking mechanism is used to secure a bicycle, as shown in FIG. 4, the cross piece is disconnected from the U-shaped shackle which is then passed through the bicycle, preferably around part of the frame, and extended to either side of the post 14. The cross piece is then connected to the shackle in the manner described above and locked. The reverse procedure is employed when disconnecting the lock mechanism from the bicycle.

Referring now more particularly to FIGS. 10 through 12, there is illustrated a bracket 44 for use in storing the lock 10 when not being used to secure the bicycle. The bracket 44 is comprised of a tubular socket 46 adapted to be fastened to the frame of the bicycle 12 by means of a bail 48 connected to the inner end of the socket. The bail connects to the socket 46 by means of a pair of pad eyes 50 and 52 which are welded or otherwise fixed to the sides of the socket and formed with openings through which the ends of the bail pass. The bail ends are threaded to engage nuts 54 and 56 whereby the bracket may be clamped into the bicycle frame, as best shown in FIGS. 11 and 12. The inner end of the socket is formed with arcuate notches 58 and 60 that conform to the contour of the bicycle frame and thereby provide a snug fit with the frame. The parts contacting the bicycle frame may be protected by a gasket, plastic coating, or other such means in order to protect the bicycle finish.

The outer end of the socket 56 is formed with a re-entrant L-shaped notch 62 originating at the outer end of the socket and extending rearwardly, lengthwise of the socket for perhaps 1" or so and then turning substantially perpendiculary through an arc of perhaps 90° or so. The inside diameter of the socket is slightly greater than the outside dimension of the cross piece, and the mouth of the slot 62 is slightly wider than the diameter of the stock used in the shackle. The lock 10 is connected to the bracket by inserting one end, preferably the lock end of the cross piece, in the open end of the socket with the shackle leg aligned with the mouth of the slot 62. In this position the shackle will be generally horizontal. The lock is then pushed inwardly until the shackle legs align with the curving portion of the slot, at which point the lock is rotated 90° so that the shackle is generally vertical, as best shown in the drawings. The lock is released by reversing the procedure.

The bracket 44 may be modified by adding a second slot on the opposite side of the socket in a configuration similar to the slot 62. By providing a socket with two slots, the bracket may be used with other types of locking devices similar to that of the present invention but having a shackle leg passing through the cross bar and projecting from the opposite side. Also, the inner end of the slot may be slightly enlarged whereby the shackle leg will seat when the lock mechanism is in position.

The bracket 44 may also be modified by providing a socket with a single straight slot in which case the socket should be mounted with its longitudinal axis as close to the vertical as possible and the slot at the top. The lock, when placed in the socket, will remain there by its own weight.

While the invention has been described with particular reference to the illustrated embodiments, numerous modifications thereto will appear to those skilled in the art. For example, parts of the lock may be altered to make them useful as tools for servicing the bicycle. The open end of the cross piece might be extended and faceted to form a socket wrench and the bent foot of the shackle leg might be tapered to form an offset screwdriver tip. Small tools or parts may be stored in the hollow center of the cross piece.

Also, the lock, while primarily intended for use with bicycles and the like, may be made in small sizes for use as a padlock. If the lock is to be provided in sizes large enough to secure a motorcycle, for example, the U-shaped shackle may be made larger and somewhat oval-shaped, as suggested in FIG. 13. In this configuration, the ends of the shackle are spaced apart the same distance as a smaller lock so that the larger shackle can use the same size crosspiece of the smaller size locks.

Having thus described the invention, what we claim and desire to obtain by Letters Patent of the United States is:

1. A lock for bicycles and the like, comprising
   (a) a U-shaped shackle, and,
   (b) a cross-piece adapted to lock across the open end of said shackle,
   (c) said shackle being formed with a pair of substantially parallel legs of substantially equal length, one of said legs being formed at the end thereof with an outwardly extending foot and the other of said legs being formed at the end thereof with a lock engaging portion, (d) said cross piece being tubular and formed with a pair of longitudinally spaced aligned openings in the side thereof to receive the ends of said shackle legs by first tilting said cross-piece and shackle with respect to one another, inserting said foot in one of said openings and then moving the end of the other leg into the other opening and including locking means in one end of said cross piece proximate said other opening and adapted to lockably engage the end of said other leg.

2. A lock, according to claim 1, wherein said shackle is formed of cylindrical hard metal rod stock.

3. A lock, according to claim 1, wherein said foot is in the plane of said legs.

4. A lock, according to claim 1, wherein said other leg is formed with a cutaway portion in the side thereof, said cutaway portion including a boss in the side of ssid other leg and recessed with respect thereto, said locking means including a cam rotatable about an axis extending substantially along the centerline of said cross piece and engageable with said boss.

5. A lock, according to claim 4, wherein said boss and cam are rounded to mutually mating contours.

* * * * *